United States Patent
Kose et al.

(10) Patent No.: US 9,786,917 B2
(45) Date of Patent: Oct. 10, 2017

(54) METHOD FOR PRODUCING BINDER COMPOSITION FOR STORAGE BATTERY DEVICE

(71) Applicant: Asahi Glass Company, Limited, Tokyo (JP)

(72) Inventors: Takehiro Kose, Tokyo (JP); Mitsuru Seki, Tokyo (JP); Mizuna Toyoda, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 94 days.

(21) Appl. No.: 14/657,475

(22) Filed: Mar. 13, 2015

(65) Prior Publication Data

US 2015/0188140 A1 Jul. 2, 2015

Related U.S. Application Data

(63) Continuation of application No. PCT/JP2013/078370, filed on Oct. 18, 2013.

(30) Foreign Application Priority Data

Oct. 19, 2012 (JP) ................................. 2012-232196

(51) Int. Cl.
| | |
|---|---|
| *H01M 4/62* | (2006.01) |
| *H01M 4/04* | (2006.01) |
| *H01M 4/1391* | (2010.01) |
| *C08F 14/18* | (2006.01) |
| *C08F 2/26* | (2006.01) |
| *C08F 214/26* | (2006.01) |
| *H01M 10/052* | (2010.01) |

(52) U.S. Cl.
CPC .............. *H01M 4/623* (2013.01); *C08F 2/26* (2013.01); *C08F 14/18* (2013.01); *C08F 214/265* (2013.01); *H01M 4/0404* (2013.01); *H01M 4/1391* (2013.01); *H01M 10/052* (2013.01); *H01M 2220/10* (2013.01); *H01M 2220/20* (2013.01); *H01M 2220/30* (2013.01); *Y02E 60/122* (2013.01); *Y02P 70/54* (2015.11)

(58) Field of Classification Search
CPC .. H01M 4/623; H01M 4/1391; H01M 4/0404; H01M 2220/10; H01M 2220/20; H01M 2220/30; H01M 10/052; C08F 2/26; C08F 14/18; C08F 214/265

See application file for complete search history.

(56) References Cited

U.S. PATENT DOCUMENTS

| 4,046,730 | A | * | 9/1977 | Tortai | C08F 259/04 523/221 |
|---|---|---|---|---|---|
| 8,716,419 | B2 | | 5/2014 | Kose et al. | |
| 8,927,668 | B2 | | 1/2015 | Kose et al. | |
| 2009/0043035 | A1 | * | 2/2009 | Cabrera | C08F 2/22 524/457 |
| 2011/0207889 | A1 | | 8/2011 | Kose et al. | |
| 2012/0231332 | A1 | | 9/2012 | Kose | |
| 2012/0295159 | A1 | | 11/2012 | Kobayashi | |
| 2013/0330621 | A1 | * | 12/2013 | Narumi | C08F 214/265 429/217 |
| 2014/0147745 | A1 | | 5/2014 | Toyoda et al. | |
| 2014/0363715 | A1 | | 12/2014 | Toyoda et al. | |
| 2015/0044561 | A1 | | 2/2015 | Kose et al. | |

FOREIGN PATENT DOCUMENTS

| JP | 2001-283855 | 10/2001 | |
|---|---|---|---|
| JP | 2011-86378 | 4/2011 | |
| JP | WO 2012111770 A1 * | 8/2012 | .......... C08F 214/265 |
| WO | 2011/055760 | 5/2011 | |
| WO | 2011/096463 | 8/2011 | |
| WO | 2012/043763 | 4/2012 | |
| WO | 2012/111770 | 8/2012 | |

OTHER PUBLICATIONS

U.S. Appl. No. 14/524,856, filed Oct. 27, 2014, Kose, et al.
U.S. Appl. No. 14/469,114, filed Aug. 26, 2014, Toyoda, et al.
U.S. Appl. No. 14/167,185, filed Jan. 29, 2014, Toyoda, et al.
U.S. Appl. No. 13/970,122, filed Aug. 19, 2013, Narumi, et al.
U.S. Appl. No. 13/451,882, filed Apr. 20, 2012, Kose.
U.S. Appl. No. 13/100,536, filed May 4, 2011, Kose, et al.
International Search Report Issued on PCT application No. PCT JP2013/078370, dated Oct. 18, 2013.

* cited by examiner

*Primary Examiner* — Dah-Wei D Yuan
*Assistant Examiner* — Jose Hernandez-Diaz
(74) *Attorney, Agent, or Firm* — Oblon, McClelland, Maier & Neustadt, L.L.P.

(57) ABSTRACT

A method for producing a binder composition for a storage battery device, which comprises an emulsion polymerization step of emulsion polymerizing a monomer mixture containing a fluorinated vinyl monomer in the presence of a first anionic emulsifying agent (A), an aqueous medium and a radical polymerization initiator to obtain a latex containing a fluorinated polymer, and a post addition step of adding a second anionic emulsifying agent (B) to the latex. The first anionic emulsifying agent (A) has no phenyl group in its molecule, and the second anionic emulsifying agent (B) has a phenyl group in its molecule.

14 Claims, No Drawings

METHOD FOR PRODUCING BINDER COMPOSITION FOR STORAGE BATTERY DEVICE

TECHNICAL FIELD

The present invention relates to a method for producing a binder composition for a storage battery device, a method for producing an electrode mixture for a storage battery device, which uses the binder composition, and a method for producing an electrode for a storage battery device, which uses the electrode mixture for a storage battery device.

BACKGROUND ART

In recent years, along with development and spread of electronic equipments represented by an interruptible power, mobile communication instruments and portable instruments, hybrid automobiles which can be driven by both energies of gasoline and electricity, and electric vehicles, the demand for improving properties of a storage battery device such as a secondary battery has been remarkably increasing. Specifically, a high performance battery having a high output, a high capacity and an excellent cyclic property is desired.

Such a storage device usually comprises electrodes, a non-aqueous electrolyte, a separator, etc. as the main members. In general, an electrode for a storage battery is produced by applying an electrode mixture for a storage battery device having an electrode active material, an electrically conductive material and a polymer as a binder dispersed in an organic solvent or water on a surface of a metal foil as a current collector, followed by drying. If the binder is incapable of fixing a sufficient amount of the battery active material on the electrode, a battery having a large initial capacity cannot be obtained, and e.g. by repeating charge and discharge, the battery active material falls away from the electrode, whereby the capacity of the battery deteriorates.

The binder for such an electrode mixture for a storage battery device is mainly classified into an organic solvent binder wherein a polymer is dissolved in an organic solvent and a water binder wherein a polymer is dissolved or dispersed in water. Particularly in recent years, attention has been paid to the water binder, since costs for producing an electrode by use of an organic solvent can be reduced, and environmental burden and working environment can be improved.

The water binder is supplied as a composition having a polymer dispersed in an aqueous medium. Particularly, many water type binders are produced by an emulsion polymerization method using an emulsifying agent, since they are excellent in productivity, molecular weight and dispersion stability.

Patent Document 1 discloses a binder composition for a lithium ion secondary battery electrode, which comprises a copolymer of styrene and 1,3-butadiene or a copolymer of styrene, methyl methacrylate and 2-ethylhexyl acrylate, prepared by emulsion polymerization using a sodium alkyl diphenyl ether disulfonate as an emulsifying agent.

Patent Document 2 proposes a fluorinated polymer as a binder for a storage battery device which is excellent in the oxidation resistance. Further, among fluorinated polymers, proposed is a copolymer of tetrafluoroethylene and propylene or a copolymer of tetrafluoroethylene, propylene and vinylidene fluoride as a binder which is excellent in the flexibility and the adhesion, as compared with polytetrafluoroethylene.

PRIOR ART DOCUMENTS

Patent Documents

Patent Document 1: JP-A-2001-283855
Patent Document 2: WO2011/055760

DISCLOSURE OF INVENTION

Technical Problem

In a step of preparing an electrode mixture, external force such as shearing force is applied in order to uniformly mix a latex containing polymer particles (binder) obtained by emulsion polymerization, an electrode active material, an electrically conductive material, etc. Here, if external force is strong, polymer particles are likely to flocculate. If the polymer particles flocculate, the binder is localized in the electrode mixture, and thereby the adhesion between the electrode active material and a current collector tends to deteriorate.

According to knowledge of the present inventors, if the amount of an emulsifying agent to be added is increased in order to improve the dispersion stability of the binder in a step of preparing an electrode mixture, the properties of a storage battery device may be impaired in some cases.

Under these circumstances, it is an object of the present invention to provide a method for producing a binder composition for a storage battery device, which is excellent in the dispersion stability, whereby properties of an electrode to be obtained are excellent.

Further, it is an object of the present invention to provide a method for producing an electrode mixture for a storage battery device, which is excellent in the dispersion stability, whereby properties of an electrode to be obtained are excellent, and a method for producing an electrode for a storage battery device, which uses the electrode mixture for a storage battery device.

Solution to Problem

As a result of extensive studies by the present inventors, they have found that when producing a fluorinated polymer by emulsion polymerization, by using an anionic emulsifying agent having no phenyl group in its molecule as an emulsifying agent to be added at a time of polymerization and by using an anionic emulsifying agent having a phenyl group in its molecule as an emulsifying agent to be added to a latex after the polymerization, the emulsion polymerization to obtain a fluorinated polymer can be appropriately carried out, and a binder composition for storage battery device which has good dispersion stability, whereby polymerized particles are not likely to flocculate, and properties of an electrode to be obtained are excellent, can be obtained. Thus, the present invention has been accomplished.

The present invention has the following constructions [1] to [11].

[1] A method for producing a binder composition for a storage battery device, which comprises an emulsion polymerization step of obtaining a latex containing a fluorinated polymer by means of emulsion polymerizing a monomer mixture containing a fluorinated vinyl monomer in the presence of the following anionic emulsifying agent (A), an aqueous medium and a radical polymerization initiator, and a post addition step of adding the following anionic emulsifying agent (B) to the latex:

anionic emulsifying agent (A): an anionic emulsifying agent having no phenyl group in its molecule, anionic emulsifying agent (B): an anionic emulsifying agent having a phenyl group in its molecule.

[2] The method for producing a binder composition for a storage battery device according to the above [1], wherein the content of the anionic emulsifying agent (A) is from 0.1 to 5 parts by mass, per 100 parts by mass of the fluorinated polymer to be produced in the emulsion polymerization step.

[3] The method for producing a binder composition for a storage battery device according to the above [1] or [2], wherein the content of the anionic emulsifying agent (B) is from 0.1 to 15 parts by mass, per 100 parts by mass of the fluorinated polymer in the latex.

[4] The method for producing a binder composition for a storage battery device according to any one of the above [1] to [3], wherein at least one of the anionic emulsifying agent (A) and the anionic emulsifying agent (B) is an emulsifying agent having a sulfonyl group.

[5] The method for producing a binder composition for a storage battery device according to any one of the above [1] to [4], wherein the anionic emulsifying agent (A) is at least one type selected from the group consisting of an alkylsulfate, a sulfosuccinate, a polyoxyalkylene alkyl ether sulfate and a polyoxyalkylene alkenyl ether sulfate.

[6] The method for producing a binder composition for a storage battery device according to any one of the above [1] to [5], wherein the anionic emulsifying agent (B) is at least one type selected from the group consisting of an alkylbenzene sulfonate and an alkyl diphenyl ether disulfonate.

[7] The method for producing a binder composition for a storage battery device according to any one of the above [1] to [6], wherein the fluorinated vinyl monomer is at least one type selected from the group consisting of tetrafluoroethylene, vinylidene fluoride and hexafluoropropylene.

[8] The method for producing a binder composition for a storage battery device according to any one of the above [1] to [7], wherein the monomer mixture further contains a non-fluorinated vinyl monomer.

[9] The method for producing a binder composition for a storage battery device according to any one of the above [1] to [8], wherein the fluorinated vinyl monomer is tetrafluoroethylene, and the monomer mixture further contains propylene.

[10] A method for producing an electrode mixture for a storage battery device, which comprises a step of producing a binder composition for a storage battery device by the production method as defined in any one of the above [1] to [9] and a step of mixing the obtained binder composition for a storage battery device and an electrode active material.

[11] A method for producing an electrode for a storage battery device, which comprises a step of producing an electrode mixture for a storage battery device by the production method as defined in the above [10] and a step of forming an electrode active material layer on a current collector by using the obtained electrode mixture for a storage battery device.

Advantageous Effects of Invention

The binder composition for a storage battery device, which is obtained by the production method of the present invention is excellent in the dispersion stability, whereby even though external force is applied, polymer particles in a latex are not likely to unify or flocculate.

In the case of the electrode mixture for a storage battery device, which contains the binder composition for a storage battery device obtained by the production method of the present invention, the dispersion stability of polymer particles is excellent, whereby an electrode active material is excellent in the dispersion uniformity, and an excellent adhesion between an electrode active material and a current collector can be obtained.

The electrode for a storage battery device, which uses the electrode mixture for a storage battery device obtained by the production method of the present invention is excellent in adhesion between an electrode active material and a current collector, whereby a storage battery device which is excellent in charge and discharge characteristics can be obtained.

DESCRIPTION OF EMBODIMENTS

In this specification, the storage battery device may, for example, be a primary lithium battery, a lithium-ion secondary battery, a lithium polymer battery, an electrolytic double layer capacitor or a lithium-ion capacitor. The storage battery device is particularly preferably a lithium-ion secondary battery, since the adhesion, the electrolytic solution resistance, the charge and discharge characteristics, etc. can thereby be effectively realized.

The method of the present invention for producing a binder composition for a storage battery device, comprises an emulsion polymerization step to obtain a latex containing a fluorinated polymer by means of emulsion polymerizing a monomer mixture containing a fluorinated vinyl monomer in the presence of the following anionic emulsifying agent (A), an aqueous medium and a radical polymerization initiator, and a post addition step of adding the following anionic emulsifying agent (B) to the latex:

anionic emulsifying agent (A): an anionic emulsifying agent having no phenyl group in its molecule, anionic emulsifying agent (B): an anionic emulsifying agent having a phenyl group in its molecule.

<Emulsion Polymerization Step>

The emulsion polymerization step in the present invention is a step to obtain a latex containing a fluorinated polymer by means of emulsion polymerizing a monomer mixture containing a fluorinated vinyl monomer in the presence of the above anionic emulsifying agent (A), an aqueous medium and a radical polymerization initiator.

(Aqueous Medium)

The aqueous medium in the present invention may be water alone, or a mixture of water and a water-soluble organic solvent. As the water-soluble organic solvent, a known compound may suitably be used which is soluble in water at an optional proportion. The water-soluble organic solvent is preferably an alcohol such as tert-butanol, propylene glycol, dipropylene glycol, dipropylene glycol monomethyl ether or tripropylene glycol. Among them, preferred is tert-butanol, propylene glycol or dipropylene glycol monomethyl ether.

In a case where the aqueous medium is a mixture of water and a water-soluble organic solvent, the content of the water-soluble organic solvent in the aqueous medium should better be small. Specifically, the water-soluble organic solvent is less than 5 parts by mass, preferably at most 1 part by mass, more preferably at most 0.5 part by mass, per 100 parts by mass of water.

When the content of the water-soluble organic solvent is within the above-mentioned range, in a case where a fluorinated polymer latex to be obtained is used as a binder composition for a storage battery device, handling for e.g. operation environmental measures may be simplified depending upon the production process of a storage battery device, such being desirable.

(Anionic Emulsifying Agent (A))

The anionic emulsifying agent (A) is an anionic emulsifying agent having no phenyl group in its molecule. The anionic emulsifying agent (A) is preferably one having a sulfonyl group. For example, a linear or branched alkyl sulfate such as sodium lauryl sulfate, ammonium lauryl sulfate, sodium myristyl sulfate, ammonium myristyl sulfate, sodium cetyl sulfate, ammonium cetyl sulfate, sodium stearyl sulfate, ammonium stearyl sulfate, sodium oleyl sulfate or ammonium oleyl sulfate; a linear or branched alkyl sulfonate such as sodium lauryl sulfonate, ammonium lauryl sulfonate, sodium myristyl sulfonate, ammonium myristyl sulfonate, sodium cetyl sulfonate, ammonium cetyl sulfonate, sodium stearyl sulfonate, ammonium stearyl sulfonate, sodium oleyl sulfonate or ammonium oleyl sulfonate; an α-olefin sulfonate such as sodium α-olefin sulfonate or ammonium α-olefin sulfonate; a dialkyl sulfosuccinate such as sodium dioctyl sulfosuccinate, sodium didecyl sulfosuccinate, sodium dihexyl sulfosuccinate, sodium diisobutyl sulfosuccinate, sodium diamyl sulfosuccinate or ammonium dioctyl sulfosuccinate; a polyoxyethylene alkyl ether sulfate such as sodium polyoxyethylene lauryl ether sulfate, ammonium polyoxyethylene lauryl ether sulfate, sodium polyoxyethylene myristyl ether sulfate, ammonium polyoxyethylene myristyl ether sulfate, sodium polyoxyethylene cetyl ether sulfate, ammonium polyoxyethylene cetyl ether sulfate, sodium polyoxyethylene stearyl ether sulfate, ammonium polyoxyethylene stearyl ether sulfate, sodium polyoxyethylene oleyl ether sulfate or ammonium polyoxyethylene oleyl ether sulfate; a polyoxyalkylene alkyl ether sulfate such as sodium sulfate of a polyoxyethylene-polyoxypropylene block copolymer, sodium sulfate of a polyoxyethylene-polyoxybutylene block copolymer or sodium sulfate of an alkyl ether of a polyoxyethylene-polyoxypropylene block copolymer; or a polyoxyalkylene alkenyl ether sulfate such as ammonium sulfate of an alkenyl ether of a polyoxyethylene-polyoxyalkylene block copolymer, may be mentioned.

Particularly, an alkyl sulfate, a dialkyl sulfosuccinate, a polyoxyalkylene alkyl ether sulfate or a polyoxyalkylene alkenyl ether sulfate is preferred, since the polymerization stability with addition of a small amount is excellent, and a fluorinated polymer having a relatively high molecular weight can be obtained. As a particularly preferred example, sodium lauryl sulfate, ammonium lauryl sulfate, sodium dioctyl sulfosuccinate, sodium didecyl sulfosuccinate, sodium dihexyl sulfosuccinate, sodium diisobutyl sulfosuccinate, sodium diamyl sulfosuccinate, ammonium dioctyl sulfosuccinate or ammonium sulfate of an alkenyl ether of a polyoxyethylene-polyoxyalkylene block copolymer may be mentioned.

The content of the anionic emulsifying agent (A) to be added is preferably from 0.1 to 5 parts by mass, more preferably from 0.5 to 4 parts by mass, particularly preferably from 1 to 3 parts by mass, per 100 parts by mass of the fluorinated polymer to be produced in the emulsion polymerization step.

When the content of the anionic emulsifying agent (A) falls within the above range, a binder composition which is excellent in the polymerization stability, adhesion and dispersion stability can be obtained, and the charge and discharge property of a battery using an electrode formed by using the binder tends to be excellent. As the anionic emulsifying agent (A), only one type of the above anionic emulsifying agent may be used, or two or more types may be used in combination.

(Radical Polymerization Initiator)

As the radical polymerization initiator, a water-soluble polymerization initiator may optionally be used.

The water-soluble polymerization initiator may, for example, be a persulfate or a water-soluble organic peroxide. Specifically, the persulfate may, for example, be ammonium persulfate, sodium persulfate or potassium persulfate, and the water-soluble organic peroxide may, for example, be disuccinic acid peroxide or azobisisobutylamidine dihydrochloride. Among them, the persulfate is preferred, and ammonium persulfate is particularly preferred.

As the mechanism to initiate a radical polymerization reaction, the following two systems may be mentioned:

(1) a heat decomposition radical polymerization initiator system wherein heat is applied in the presence of a radical polymerization initiator to cause radical decomposition;

(2) a redox radical polymerization initiator system wherein a radical polymerization initiator and an oxidation-reduction catalyst (so-called redox catalyst) are used in combination.

In either system, the amount of the radical polymerization initiator to be used is preferably from 0.0001 to 3 parts by mass, more preferably from 0.001 to 1 part by mass, per 100 parts by mass of the fluorinated polymer to be formed in the emulsion polymerization step.

As the radical polymerization initiator to be used in (1) the heat decomposition radical polymerization initiator system, a water-soluble initiator of which one hour half-life temperature is from 50 to 100° C., may be employed. It may be suitably selected for use among water-soluble initiators which are commonly used for usual emulsion polymerization.

As the radical polymerization initiator and the redox catalyst to be used in (2) the redox radical polymerization initiator system, preferred is a system wherein ammonium persulfate, sodium hydroxymethane sulfinate, disodium ethylenediamine tetraacetate dihydrate and ferrous sulfate are used in combination, a system wherein potassium permanganate and oxalic acid are used in combination, a system wherein potassium bromate and ammonium sulfite are used in combination, or a system wherein ammonium persulfate and ammonium sulfite are used in combination. Among them, particularly preferred is a system wherein ammonium persulfate, sodium hydroxymethane sulfinate (also called Rongalite catalyst), disodium ethylenediamine tetraacetate dihydrate and ferrous sulfate are used in combination.

<Fluorinated Polymer>

The fluorinated polymer of the present invention is produced by emulsion polymerizing a monomer mixture containing a fluorinated vinyl monomer. The fluorinated vinyl monomer in the present invention may, for example, be a perfluoromonomer such as tetrafluoroethylene (hereinafter referred to as "TFE"), hexafluoropropylene (HFP), or perfluoro(alkyl vinyl ether) (PAVE); or a non-perfluoromonomer such as vinylidene fluoride (VdF), chlorotrifluoroethylene (CTFE), vinyl fluoride (VF), 3,3,3-trifluoro-1-propene (TFP), 1,1,2-trifluoroethylene (TrFE), 1,3,3,3-tetrafluoropropene (TeFP), 1,2-difluoroethylene (DiFE), 3,3,4,4-tetrafluoro-1-butene, 3,3,4,4,4-tetrafluoro-1-butene or 3,3,4,4,4-pentafluoro-1-butene. As specific examples of PAVE, PMVE (perfluoro(methyl vinyl ether)), PPVE (perfluoro(propyl vinyl ether)), perfluoro(3,6-dioxa-1-heptene), perfluoro(3,6-dioxa-1-octene) or perfluoro(5-methyl-3,6-dioxa-1-nonene) may be mentioned.

Among such fluorinated vinyl monomers, tetrafluoroethylene, hexafluoropropylene, vinyl fluoride, vinylidene fluoride, chlorotrifluoroethylene or a perfluoro(alkyl vinyl ether) is preferred, in view of availability and since the electrolytic solution resistance and bonding property as the binder are excellent. Particularly, tetrafluoroethylene, vinylidene fluoride or hexafluoropropylene is more preferred, and tetrafluoroethylene is preferred.

The fluorinated vinyl monomer is not particularly restricted, and one type or two or more types may be used.

The monomer mixture of the present invention preferably further contains a non-fluorinated vinyl monomer in addition to the above fluorinated vinyl monomer.

As the non-fluorinated vinyl monomer, for example, an olefin such as ethylene (E), propylene (P), isobutylene or n-butene; a vinyl ether such as ethyl vinyl ether, cyclohexyl vinyl ether or methyl vinyl ether; or a vinyl ester such as vinyl acetate, vinyl benzoate, vinyl pivalate, vinyl laurate, vinyl stearate or vinyl cyclohexycarboxylate is preferred; ethylene, propylene or ethyl vinyl is more preferred; and propylene is particularly preferred. A fluorinated polymer to be obtained from a monomer mixture containing a non-fluorinated vinyl monomer, contains structural units based on a non-fluorinated vinyl monomer, in addition to structural units based on a fluorinated vinyl monomer, whereby the electrolytic solution resistance, oxidation resistance and flexibility as a binder are improved.

As specific examples of the fluorinated polymer of the present invention, a TFE/P copolymer, a TFE/PNdF copolymer, a VdF/HFP copolymer, a TFENdF/HFP copolymer, a TFE/PAVE copolymer, a TFE/PMVE copolymer, a TFE/P/TFP copolymer, a TFE/PNdF/TFP copolymer, a VdF/HFP/TFP copolymer, a TFENdF/HFP/TFP copolymer, a TFE/PPVE copolymer, a TFE/PMVE/PPVE copolymer, a VdF/PAVE copolymer, an E/PAVE copolymer, an E/HFP copolymer, a TFE/P/TeFP copolymer, a TFE/P/TrFE copolymer, a TFE/PNF copolymer and a TFE/P/DiFE copolymer may be mentioned. Preferred is a TFE/P copolymer, a TFE/PNdF copolymer, a VdF/HFP copolymer, a TFENdF/HFP copolymer, a TFE/P/TFP copolymer, a TFE/PPVE copolymer, a TFE/PMVE copolymer or a TFE/PMVE/PPVE copolymer.

Among them, the TFE/P copolymer or the TFE/PNdF copolymer is particularly preferred.

The fluorinated polymer preferably has the following copolymer composition. When the copolymer composition falls within the following range, the electrolytic solution resistance, oxidation resistance and flexibility as the binder, are excellent.

In the TFE/P copolymer, the structural units based on TFE/structural units based on P=40/60 to 60/40 (molar ratio), in the TFE/PNdF copolymer, the structural units based on TFE/structural units based on P/structural units based on VdF=30 to 60/60 to 20/0.05 to 40 (molar ratio), in the VdF/HFP copolymer, the structural units based on VdF/structural units based on HFP=1/99 to 95/5 (molar ratio), and in the TFENdF/HFP copolymer, the structural units based on TFE/structural units based on VdF/structural units based on HFP=20 to 40/1 to 40/20 to 40 (molar ratio).

In the TFE/PAVE copolymer, the structural units based on TFE/structural units based on PAVE=40/60 to 70/30 (molar ratio), in the TFE/PMVE copolymer, the structural units based on TFE/structural units based on PMVE=40/60 to 70/30 (molar ratio), in the TFE/PPVE copolymer, the structural units based on TFE/structural units based on PPVE=40/60 to 70/30 (molar ratio), in the TFE/PMVE/PPVE copolymer, the structural units based on TFE/structural units based on PMVE/structural units based on PPVE=40 to 70/3 to 57/3 to 57 (molar ratio), in the VdF/PAVE copolymer, the structural units based on VdF/structural units based on PAVE=3/97 to 95/5 (molar ratio), and in the E/PAVE copolymer, the structural units based on E/structural units based on PAVE=40/60 to 60/40 (molar ratio).

In the E/HFP copolymer, the structural units based on E/structural units based on HFP=40/60 to 60/40 (molar ratio), in the TFE/P/TFP copolymer, the structural units based on TFE/structural units based on P/structural units based on TFP=40 to 60/60 to 40/0.05 to 20 (molar ratio), in the TFE/PNdF/TFP copolymer, the structural units based on TFE/structural units based on P/structural units based on VdF/structural units based on TFP=30 to 60/60 to 20/0.05 to 40/0.05 to 20 (molar ratio), and in the VdF/HFP/TFP copolymer, the structural units based on VdF/structural units based on HFP/structural units based on TFP=1 to 95/99 to 5/0.05 to 20 (molar ratio).

In the TFENdF/HFP/TFP copolymer, the structural units based on TFE/structural units based on VdF/structural units based on HFP/structural units based on TFP=30 to 60/0.05 to 40/60 to 20/0.05 to 20 (molar ratio), in the TFE/P/TeFP copolymer, the structural units based on TFE/structural units based on P/structural units based on TeFP=30 to 60/60 to 20/0.05 to 40 (molar ratio), in the TFE/P/TrFE copolymer, the structural units based on TFE/structural units based on P/structural units based on TrFE=30 to 60/60 to 20/0.05 to 40 (molar ratio), in the TFE/PNF copolymer, the structural units based on TFE/structural units based on P/structural units based on VF=30 to 60/60 to 20/0.05 to 40 (molar ratio), and in the TFE/P/DiFE copolymer, the structural units based on TFE/structural units based on P/structural units based on DiFE=30 to 60/60 to 20/0.05 to 40 (molar ratio), The monomer mixture of the present invention preferably contains a monomer having at least 2 vinyl groups in its molecule as a crosslinkable monomer, in addition to the above fluorinated vinyl monomer. As the crosslinkable monomer, a fluorinated divinyl monomer represented by the formula $CF_2=CFOR_fOCF=CF_2$ (in the formula, $R_f$ is a $C_{1-25}$ perfluoro saturated hydrocarbon group which may have an etheric oxygen atom) may be mentioned, and specifically, $CF_2=CFO(CF_2)_4OCF=CF_2$, $CF_2=CFO(CF_2)_2OCF=CF_2$ or $CF_2=CFO(CF_2)_2OCF(CF_3)CF_2OCF=CF_2$ is preferred.

Further, at least one non-fluorinated vinyl monomer selected from the group consisting of monomers represented by the following formula (I), (II) and (III) may, for example, be mentioned.

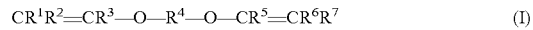

$$CR^1R^2=CR^3-O-R^4-O-CR^5=CR^6R^7 \quad (I)$$

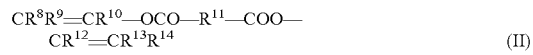

$$CR^8R^9=CR^{10}-OCO-R^{11}-COO-CR^{12}=CR^{13}R^{14} \quad (II)$$

$$CR^{15}R^{16}=CR^{17}COOCH=CH_2 \quad (III)$$

(wherein, each of $R^1$, $R^2$, $R^3$, $R^5$, $R^6$, $R^7$, $R^8$, $R^9$, $R^{10}$, $R^{12}$, $R^{13}$, $R^{14}$, and $R^{17}$ which are independent of one another is a hydrogen atom, a fluorine atom or a methyl group, $R^4$ and $R^{11}$ are a $C_{1-10}$ alkylene group which may have an etheric oxygen atom, and each of $R^{15}$ and $R^{16}$ are which are independent of one another is a $C_{1-10}$ alkyl group which may have a hydrogen atom or an etheric oxygen atom).

As a specific example, 1,4-butandiol divinyl ether, divinyl adipate, vinyl crotonate or vinyl methacrylate is preferred.

The proportion of the above crosslinkable monomer is preferably at most 3 mol %, per the total of the all monomers.

The Mooney viscosity of the fluorinated polymer is preferably from 5 to 200, more preferably from 50 to 180, further preferably from 70 to 180, most preferably from 100 to 150.

The Mooney viscosity is a value measured in accordance with the measuring method in the after mentioned Examples and is an index for a molecular weight of a polymer material such as a rubber. The value of the Mooney viscosity being large indirectly indicates that the molecular weight is high (Procedure of Emulsion Polymerization)

The emulsion polymerization step in the present invention may be conducted by a known emulsion polymerization method. For example, it may be conducted by the following procedure.

Firstly, a pressure-resistant reactor is deaerated, and then, into the reactor, an aqueous medium, an emulsifying agent, a radical polymerization initiator, if necessary a pH-adjusting agent, and, in the case of a redox radical polymerization initiator system, a redox catalyst, are charged. Then, after raising the temperature to a predetermined polymerization temperature, monomers are supplied. Further, if necessary, a catalyst (e.g. a Rongalite catalyst in the case of the redox radical polymerization initiator system) is supplied. When the polymerization initiator is activated and the polymerization reaction is initiated, the pressure in the reactor begins to decrease. That is, the initiation (the starting point of the reaction time) of the polymerization reaction can be confirmed by the decrease of the pressure.

After confirming the decrease of the pressure in the reactor, monomers are additionally supplied, and while maintaining the predetermined polymerization temperature and polymerization pressure, the polymerization reaction is conducted to form a fluorinated polymer. When the total amount of the additionally supplied monomer mixture has reached a predetermined value, the interior of the reactor is cooled to stop the polymerization reaction (the terminal point of the reaction time), to obtain a latex containing a fluorinated polymer. The latex thus obtained contains particles of the fluorinated polymer and the emulsifying agent in the aqueous medium.

In the present invention, the total amount of monomers additionally supplied during a polymerization reaction is considered to be equivalent to an amount of a fluorinated polymer produced by the emulsion polymerization step.

In the case of (1) the heat decomposition radical polymerization initiator system, the polymerization temperature during the polymerization reaction period is preferably from 50° C. to 100° C., more preferably from 60° C. to 90° C., particularly preferably from 65° C. to 80° C. When the polymerization temperature is within such a range, the polymerization rate will be proper and can easily be controlled, the productivity will be excellent, and favorable stability of the latex will be readily obtainable.

In the case of (2) the redox radical polymerization initiator system, the polymerization temperature during the polymerization reaction period is preferably from 0° C. to 100° C., more preferably from 10° C. to 90° C., particularly preferably from 20° C. to 60° C. When the polymerization temperature is within such a range, the polymerization rate will be proper and can easily be controlled, the productivity will be excellent, and favorable stability of the latex will be readily obtainable.

In either system, the polymerization pressure during the polymerization reaction period is preferably from 1.0 to 10 MPaG, more preferably from 1.5 to 5.0 MPaG, particularly preferably from 1.7 to 3.0 MPaG. If the polymerization pressure is less than 1.0 MPaG, the polymerization rate may be too low. When the polymerization pressure is within the above range, the polymerization rate will be proper and can easily be controlled, and the productivity will be excellent.

(pH-Adjusting Agent)

In the emulsion polymerization step, a pH-adjusting agent may be added. The pH-adjusting agent is preferably an inorganic salt, and a known inorganic salt may be used as the pH-adjusting agent in the emulsion polymerization. The pH-adjusting agent may specifically be e.g. a phosphoric acid salt such as disodium hydrogenphosphate or sodium dihydrogenphosphate; or a carbonic acid salt such as sodium hydrogencarbonate or sodium carbonate. A more preferred specific example of the phosphoric acid salt may, for example, be disodium hydrogenphosphate dihydrate or disodium hydrogenphosphate dodecahydrate. Further, in order to adjust the pH to a desired level, a base such as sodium hydroxide or potassium hydroxide, or an acid such as sulfuric acid, hydrochloric acid or nitric acid may be used in combination.

The pH in the aqueous medium in the emulsion polymerization step is preferably from 4 to 12, more preferably 6 to 11.

By addition of the pH-adjusting agent, the polymerization rate and the stability of the obtainable latex can be improved.

The content of a fluorinated polymer in a latex obtained in the emulsion polymerization step of the present invention is preferably from 5 to 60 mass %, more preferably from 10 to 50 mass %, particularly preferably from 15 to 40 mass %.

<Post Addition Step>

(Anionic Emulsifying Agent (B))

The post addition step in the present invention is a step of adding the following anionic emulsifying agent (B) to a latex containing a fluorinated polymer obtained by the above emulsion polymerization step.

The anionic emulsifying agent (B) is an anionic emulsifying agent having a phenyl group in its molecule. The anionic emulsifying agent (B) is preferably one having a sulfonyl group. For example, preferred is a linear or branched alkylbenzene sulfonate such as sodium dodecylbenzene sulfonate, ammonium dodecylbenzene sulfonate, sodium octylbenzene sulfonate or ammonium octylbenzene sulfonate; or an alkyl diphenyl ether disulfonate such as sodium alkyl diphenyl ether disulfonate or ammonium alkyl diphenyl ether disulfonate.

Sodium dodecylbenzene sulfonate, ammonium dodecylbenzene sulfonate, sodium alkyl diphenyl ether disulfonate or ammonium alkyl diphenyl ether disulfonate is preferred, whereby the stability with small amount addition is excellent, and the charge and discharge property of a battery to be obtained by using the binder is excellent. Sodium alkyl diphenyl ether disulfonate or ammonium alkyl diphenyl ether disulfonate is particularly preferred since a better dispersion stability is likely to be obtained.

The content of the anionic emulsifying agent (B) is preferably from 0.1 to 15 parts by mass, more preferably from 0.5 to 10 parts by mass, particularly preferably from 1 to 5 parts by mass, per 100 parts by mass of the fluorinated polymer. When the content of the anionic emulsifying agent (B) falls within the above range, a binder composition which is excellent in the adhesion and dispersion stability can be obtained, and the charge and discharge property of a battery having an electrode formed by using the binder tends to be excellent. As the anionic emulsifying agent (B), only one type of the above anionic emulsifying agent may be used, or two or more types may be used in combination.

In the present invention, as the binder composition for a storage battery device, preferably at least one of the anionic emulsifying agent (A) and the anionic emulsifying agent (B) has a sulfonyl group, and more preferably both of the anionic emulsifying agents have a sulfonyl group.

The total content of the anionic emulsifying agent (A) and the anionic emulsifying agent (B) is preferably from 0.2 to 20 parts by mass, more preferably from 0.5 to 15 parts by mass, further preferably from 1 to 10 parts by mass, particularly preferably from 2 to 7 parts by mass, per 100 parts by mass of the fluorinated polymer.

The content of the fluorinated polymer in the binder composition for a storage battery device of the present invention is preferably from 5 to 40 mass %, more preferably from 10 to 40 mass %, further preferably from 15 to 35 mass %, particularly preferably from 25 to 35 mass %. When the content of the fluorinated polymer in the binder composition is at least the lower limit value in the above range, at the time of preparing an electrode mixture by using such a binder composition as a binder for a storage battery device, a favorable viscosity of the electrode mixture tends to be readily obtainable, and a highly thick coating can be formed on a current collector. When the content of the fluorinated polymer in the binder composition is at most the upper limit value in the above range, at the time of preparing an electrode mixture by dispersing an electrode active material, etc. in the binder composition, a favorable dispersion stability tends to be readily obtainable, and a favorable coating property of the electrode mixture tends to be readily obtainable.

In the binder composition for a storage battery device of the present invention, a solid component other than the particles of the fluorinated polymer may be added, so long as the effect of the present invention are not impaired.

<Method for Producing Electrode Mixture for Storage Battery Device>

The method for producing an electrode mixture for a storage battery device (sometimes referred to simply as "the electrode mixture" in this specification) of the present invention comprises a step to produce a binder composition for a storage battery device and a step of mixing the obtained binder composition and an electrode active material. If necessary, the electrode mixture may contain an electrically conductive material and other components.

The electrode active material to be used in the present invention is not particularly limited, and a known material may suitably be used.

As a positive electrode active material, a metal oxide such as $MnO_2$, $V_2O_5$ or $V_6O_{13}$; a metal sulfide such as $TiS_2$, $MoS_2$ or FeS; a lithium composite metal oxide containing a transition metal element such as Co, Ni, Mn, Fe or Ti, such as $LiCoO_2$, $LiNiO_2$ or $LiMn_2O_4$; or a compound having a part of the transition metal element in such a compound substituted by another metal; may be exemplified. Further, an electrically conductive polymer material such as polyacetylene or poly-p-phenylene may also be used. Still further, a part or whole of the surface thereof may be covered with a carbon material or an inorganic compound.

As a negative electrode active material, a carbide of a polymer compound such as coke, graphite, mesophase pitch microspheres, a phenol resin or polyparaphenylene; or a carbonaceous material such as vapour-grown carbon fibers or carbon fibers, may, for example, be mentioned. Further, a metal such as Si, Sn, Sb, Al, Zn or W which may be alloyed with lithium, may also be mentioned. As an electrode active material, one having an electrically conductive material deposited on a surface by a mechanical modification method may also be used.

In the case of an electrode mixture for a lithium-ion secondary battery, the electrode active material to be used, may be one capable of reversibly introducing and discharging lithium ions by applying an electric potential in an electrolyte, and either an inorganic compound or an organic compound may be used.

It is particularly preferred to incorporate an electrically conductive material to an electrode mixture to be used for the production of a positive electrode. By incorporating an electrically conductive material, the electrical contact in the electrode active material is improved to lower the electrical resistance in the active material layer, whereby the discharge rate of a non-aqueous secondary battery may be improved.

The electrically conductive material may, for example, be an electrically conductive carbon such as acetylene black, ketjen black, carbon black, graphite, vapour-grown carbon fibers or carbon nanotubes.

It is preferred in the present invention that the electrode mixture contains an electrically conductive material, since the effect to reduce the electrical resistance is large with an addition of a small amount of an electrically conductive material.

The content of the electrode active material in the electrode mixture of the present invention is preferably from 20 to 90 mass %, more preferably from 30 to 80 mass %, particularly preferably from 40 to 70 mass %.

The content of the fluorinated polymer in the electrode mixture is preferably from 0.1 to 20 mass %, more preferably from 0.5 to 10 mass %, particularly preferably from 1 to 8 mass %.

Further, in a case where the electrode mixture contains an electrically conductive material, the content of the electrically conductive material in the electrode mixture is preferably higher than 0 mass % and at most 20 mass %, more preferably from 1 to 10 mass %, particularly preferably from 3 to 8 mass %.

The solid content concentration in the electrode mixture is preferably from 30 to 95 mass %, more preferably from 40 to 85 mass %, particularly preferably from 45 to 80 mass %.

For the electrode mixture of the present invention, a known water-soluble thickener may be used in order to improve the stability and coating properties of the electrode mixture. The water-soluble thickener is not particularly limited so long as it is a polymer which is soluble in water at 25° C. to show the thickening property. Specifically, it may, for example, be a water-soluble polymer, such as a cellulose type polymer such as carboxymethyl cellulose, methyl cellulose or hydroxypropyl cellulose, or its ammonium salt or alkali metal salt, a poly(meth)acrylic acid or its ammonium salt or alkali metal salt, polyvinyl alcohol, polyethylene oxide, polyvinyl pyrrolidone, a copolymer of acrylic acid or an acrylate with vinyl alcohol, a completely or partially saponified product of a copolymer of maleic anhydride, maleic acid or fumaric acid with vinyl acetate, a modified polyvinyl alcohol, a modified polyacrylic acid, polyethylene glycol, polycarboxylic acid, an ethylene/vinyl alcohol copolymer, or a vinyl acetate polymer.

The content of the water-soluble thickener in the electrode mixture is preferably from 0.01 to 10 parts by mass, more preferably from 0.05 to 5 parts by mass, particularly preferably from 0.1 to 2 parts by mass, per 100 parts by mass of the electrode active material. When the content of the water-soluble thickener is within such a range, it is possible to obtain an electrode mixture excellent in dispersibility of active material, etc. in the electrode mixture and having high stability, and it is possible to obtain a flat and smooth electrode and excellent battery characteristics.

In the method for producing a positive electrode mixture, the mixing method or the mixing order is not particularly restricted, and the positive electrode can be produced by a known method. For example, a method may be employed such that components such as a positive electrode active material and an electrically conductive material are added in an aqueous solution of a water-soluble thickener, and an aqueous medium is additionally added and mixed, followed by adding a binder composition containing a fluorinated polymer and mixing.

The mixer used for mixing is not particularly restricted, so long as the above components can be uniformly mixed. A blade type stirrer such as a planetary mixer, a disper or a kneader, a monoaxial or biaxial extruder, a ball mill, a beads mill, a roll mill, a Henschel mixer, a planetary centrifugal mixer, a thin-film spin system high-speed mixer or the like may be used. Among them, the beads mill, the planetary, the planetary centrifugal mixer, the thin-film spin system high-speed mixer or the like is preferred, since dispersion at a high concentration can be carried out.

<Method for Producing Electrode for a Storage Battery Device>

The method for producing an electrode for a storage battery device of the present invention comprises a step to produce the electrode mixture for a storage battery device and a step to form an electrode active material layer on a current collector by using the obtained electrode mixture for a storage battery device. That is, the electrode for a storage battery device of the present invention has a current collector and on the current collector, an electrode active material layer comprising a fluorinated polymer derived from the binder composition for a storage battery device of the present invention, an anionic emulsifying agent (A) and an anionic emulsifying agent (B).

The current collector is not particularly limited so long as it is made of an electrically conductive material, and it may usually be a metal foil, a metal net or a metal madreporite, of e.g. aluminum, nickel, stainless steel or copper. As a positive electrode current collector, aluminum is preferably used, and as a negative electrode current collector, copper is preferably used. The thickness of the current collector is preferably from 1 to 100 μm.

As a method for producing the electrode for a storage battery device, for example, the electrode mixture of the present invention is applied at least on one surface, preferably on both surfaces of a current collector, followed by drying to remove a medium in the electrode mixture thereby to form an electrode active material layer. If necessary, the electrode active material layer after the drying may be pressed to a desired thickness.

As a method for applying the electrode mixture to the current collector, various coating methods may be mentioned. For example, a doctor blade method, a dipping method, a reverse roll method, a direct roll method, a gravure method, an extrusion method and a brushing method may be mentioned. The coating temperature is not particularly limited, but usually a temperature in the vicinity of room temperature is preferred. The drying may be carried out by means of various drying methods, e.g. a warm air, hot air or low wet air drying method, a vacuum drying method and a drying method by irradiation with (far) infrared rays, electron rays, etc. The drying temperature is not particularly limited, but by a heating type vacuum drier, etc., a temperature of from room temperature to 200° C. is usually preferred. The pressing method may be carried out by means of a die press or a roll press.

<Lithium-Ion Secondary Battery>

A lithium-ion secondary battery as a storage battery device has the electrode for a storage battery device of the present invention as an electrode of at least one of the positive electrode and the negative electrode and has an electrolytic solution. Further, it preferably has a separator.

The electrolytic solution comprises an electrolyte and a solvent. As the solvent, an aprotic organic solvent, e.g. an alkyl carbonate such as dimethyl carbonate (DMC), ethylene carbonate (EC), diethyl carbonate (DEC), propylene carbonate (PC), butylene carbonate (BC) or methylethyl carbonate (MEC); an ester such as γ-butyrolactone or methyl formate; an ether such as 1,2-dimethoxyethane or tetrahydrofuran; or a sulfur-containing compound such as sulfolane or dimethyl sulfoxide; may be used. Particularly preferred is dimethyl carbonate, ethylene carbonate, propylene carbonate, diethyl carbonate or methylethyl carbonate, whereby a high ion conductivity is obtainable, and the useful temperature range is wide. These solvents may be used alone, or at least two of them may be used as mixed.

The electrolyte may be a lithium salt such as $LiClO_4$, $LiBF_4$, $LiPF_6$, $LiAsF_5$, $CF_3SO_3Li$ or $(CF_3SO_2)_2NLi$.

<Function and Mechanism>

As shown in Examples mentioned below, if an anionic emulsifying agent (B) having a phenyl group in its molecule is used for emulsion polymerization to form a fluorinated polymer, the molecular weight of a polymer tends to be small, and thereby it is inappropriate as an emulsifying agent for emulsion polymerization. The reason is considered that if an anionic emulsifying agent (B) having a phenyl group is present in a polymerization reaction to obtain a fluorinated polymer, a chain transfer reaction easily occurs, and as a result, a polymer to be formed is made to be small molecular weight.

On the other hand, the anionic emulsifying agent (B) does not impair charge and discharge rate characteristics of a secondary battery produced by using a binder composition for a storage battery device which contains the anionic emulsifying agent (B).

Accordingly, by producing a latex containing a fluorinated polymer by emulsion polymerization using an anionic emulsifying agent (A) having no phenyl group in its molecule, followed by adding an anionic emulsifying agent (B) having a phenyl group, an adverse effect on the charge and discharge rate characteristics of a secondary battery can be suppressed, and the dispersion stability of a binder composition for a storage battery device in an electrode mixture can be improved.

EXAMPLES

Now, the present invention will be described with reference to examples, but it should be understood that the present invention is by no means limited to these Examples. Experiments and evaluations in working Examples and Comparative Examples were conducted by the following methods.

(1) Mooney Viscosity of Fluorinated Polymer

A 1.5 mass % calcium chloride aqueous solution was added to a latex obtained by emulsion polymerization and salted out to flocculate a fluorinated polymer. The flocculated fluorinated polymer was dried, and then the Mooney viscosity was measured in accordance with JIS K6300, by using an L type rotor having a diameter of 38.1 mm and a thickness of 5.54 mm and setting preheating time of 1 minute at 100° C. and time of rotation of the rotor to 4 minutes. The higher value indirectly means that the fluorinated polymer has a high molecular weight.

(2) Evaluation of Dispersion Stability of Binder Composition

A binder composition was kneaded for 5 minutes by a thin-film spin system high-speed mixer (tradename: T. K. FILMIX 40-40 (manufactured by PRIMIX Corporation)) at a rotational rate of 15,000 rpm (shear rate 15,000 s-1), and then a flocculated polymer which remained on a metal gauze made of stainless steel (200 meshes, opening of 0.075 mm) without passing it was dried, and the weight of the flocculated polymer was measured. The flocculation rate of the binder composition was calculated by the following formula. The lower flocculation rate means that the dispersion stability of the binder composition is high.

Flocculation rate (%)=(Weight of flocculated polymer after drying/amount of polymer in binder composition)×100

(3) Adhesion (Peel Strength)

An electrode (positive electrode) produced in each Example was cut in a strip form of 2 cm in width×15 cm in length and fixed so that the coating film surface of the electrode mixture faced upward. An adhesive tape was bonded to the coating film surface of the electrode mixture, and the adhesive tape was peeled in a 180° direction at a rate of 100 mm/min, whereby the strength (N) was measured. The measurement was repeated 5 times, and the average value was taken as the peel strength. The larger the value is, the better the adhesion (bonding property) by the binder is. That is, it indicates that the adhesion in the electrode active material and the adhesion between the electrode active material and the current collector bonded by the binder are excellent.

(4) Charge and Discharge Cycle Characteristics

Evaluation of the charge and discharge characteristics of a secondary battery was conducted by the following method.

A positive electrode produced in each Example was cut out in a circular form with a diameter of 18 mmϕ, and a lithium metal foil having the same area as the circular form, and a separator made of polyethylene were laminated in a 2016 type coin cell in the order of the lithium metal foil, the separator and the positive electrode to prepare a battery element. A non-aqueous electrolytic solution of a 1M-LiPF6 ethylmethyl carbonate/ethylene carbonate (volume ratio: 1:1) was added thereto, and the cell was closed to obtain a coin type non-aqueous electrolytic solution secondary battery.

At 25° C., charging was carried out at a constant current corresponding to 0.2 C to 4.5V (the voltage represents a voltage against lithium), and charging was further carried out until the current value became 0.02 C at the charging upper limit voltage, and then, discharging was carried out at a constant current corresponding to 0.2 C to 3V, to complete a cycle. The capacity retention rate (unit: %) of the discharge capacity at the 100th cycle to the discharge capacity at the first cycle was obtained and used as an index for measurement of the charge and discharge of the battery. The higher the value of the capacity retention rate is, the more the characteristics are excellent.

Here, 1 C represents a current value to discharge a standard capacity of a battery in one hour, and 0.2 C represents a current value of ⅕ thereof.

(5) Discharge Rate Characteristics

Using a coin type non-aqueous electrolytic solution secondary battery prepared in the same manner as for the charge and discharge characteristic test, at 25° C., charging was carried out at a constant current corresponding to 0.2 C to 4.5V (the voltage represents a voltage against lithium), and charging was further carried out until the current value became 0.02 C at the charging upper limit voltage, and then, discharging was carried out at a constant current corresponding to 0.2 C to 3V. Then, discharging was carried out in the same manner as mentioned above, and discharging was carried out at a constant current corresponding to 3 C to 3V, whereby the discharge rate characteristics were evaluated. The retention rate of the discharge capacity after 3 C discharge based on the discharge capacity after 0.2 C discharge of 100% was calculated based on the following formula to obtain the initial discharge capacity ratio. The high initial discharge capacity ratio means that the resistance in the electrode is small, and such a battery is excellent.

Discharge capacity ratio (%)=(3 C discharge capacity/0.2 C discharge capacity)×100

Then, using the battery subjected to 100 charge and discharge cycles in the charge and discharge characteristic test (4), 3 C discharge was carried out in the same manner as above, and the discharge capacity ratio after 100 cycles was calculated. A higher discharge capacity ratio after 100 cycles means that an increase of the resistance in the electrode is suppressed even after the charge and discharge cycles.

The following emulsifying agents were used in Examples described below.

A1: Sodium lauryl sulfate
A2: Ammonium lauryl sulfate
A3: Sodium dialkyl sulfosuccinate (PELEX CS (tradename), manufactured by Kao Corporation)
B1: Sodium alkyl diphenyl ether disulfonate (PELEX SS-L (tradename), manufactured by Kao Corporation)
B2: Sodium dodecylbenzene sulfonate (NEOPELEX G (tradename), manufactured by Kao Corporation)

[Preparation Example 1] Preparation of Fluorinated Polymer a

The interior of a stainless steel pressure resistant reactor having an internal capacity of 3200 mL and equipped with stirring anchor vanes, was deaerated, and then, to the reactor, 1,700 g of deionized water, 18.0 g of sodium lauryl sulfate (A1) as an anionic emulsifying agent (A), 60 g of disodium hydrogenphosphate dodecahydrate and 0.9 g of sodium hydroxide, as pH-adjusting agents, and 4.4 g of ammonium persulfate (one hour half-life temperature: 82° C.) as an initiator, were added. Further, an aqueous solution having 0.4 g of disodium ethylenediamine tetraacetate dihydrate (hereinafter referred to as EDTA) as a redox catalyst and 0.3 g of ferrous sulfate heptahydrate dissolved in 200 g of deionized water, was added to the reactor. The pH of the aqueous medium in the reactor was 9.2 at that time.

Then, at 40° C., a monomer mixture gas of TFE/P=88/12 (molar ratio) was injected under pressure so that the internal pressure of the reactor became 2.50 MPaG. By rotating anchor vanes at 300 rpm, sodium hydroxymethane sulfinate dihydrate (hereinafter referred to as Rongalite) having the pH adjusted to 10.0 with sodium hydroxide, was added to the reactor to initiate a polymerization reaction.

While the polymerization temperature was maintained at 40° C., and a monomer mixture gas of TFE/P=56/44 (molar ratio) was optionally injected by the self pressure, the internal pressure of the reactor was maintained at about 2.50 MPaG to continue the polymerization reaction. When the injected amount of the monomer mixture gas of TFE/P became 900 g, the internal temperature of the reactor was cooled to 10° C. to obtain a latex of a fluorinated elastic polymer a. The polymerization time was 6 hours. The content of the fluorinated polymer a in the latex was 31 mass %.

The copolymer composition of the fluorinated polymer a was such that the ratio of structural units based on TFE and structural units based on P, namely TFE/P, was 56/44. The Mooney viscosity of the fluorinated polymer a was 110.

[Preparation Example 2] Preparation of Fluorinated Polymer b

A latex of a fluorinated polymer b was prepared in the same manner as in Preparation Example 1, except that the amount of sodium lauryl sulfate (A1) added was changed to 7.5 g, and the polymerization time was changed to 8 hours. The content of the fluorinated polymer b in the latex was 32 mass %. The copolymer composition of the fluorinated polymer b was TFE/P=56/44. The Mooney viscosity of the fluorinated polymer b was 130.

[Preparation Example 3] Preparation of Fluorinated Polymer c

A latex of a fluorinated polymer c was prepared in the same manner as in Preparation Example 1, except that the amount of sodium lauryl sulfate (A1) added was changed to 36.0 g, and the polymerization time was changed to 8 hours. The content of the fluorinated polymer c in the latex was 30 mass %. The copolymer composition of the fluorinated polymer c was TFE/P=56/44. The Mooney viscosity of the fluorinated polymer c was 70.

[Preparation Example 4] Preparation of Fluorinated Polymer d

A latex of a fluorinated polymer d was prepared in the same manner as in Preparation Example 1, except that 18.0 g of ammonium lauryl sulfate (A2) was used as an anionic emulsifying agent (A) instead of sodium lauryl sulfate. The content of the fluorinated polymer d in the latex was 31 mass %. The copolymer composition of the fluorinated polymer d was TFE/P=56/44. The Mooney viscosity of the fluorinated polymer d was 130.

[Preparation Example 5] Preparation of Fluorinated Polymer e

A latex of a fluorinated polymer e was prepared in the same manner as in Preparation Example 1, except that as an emulsifying agent, 18.0 g of sodium alkyl diphenyl ether disulfonate ("PELEX SS-L" (tradename) manufactured by Kao Corporation) which is an anionic emulsifying agent (B) was used as an anionic emulsifying agent (A) instead of sodium lauryl sulfate, and the polymerization time was changed to 12 hours. The content of the fluorinated polymer e in the latex was 29 mass %. The copolymer composition of the fluorinated polymer e was TFE/P=56/44.

The Mooney viscosity of the fluorinated polymer e was 60.

[Preparation Example 6] Production of Fluorinated Polymer f

A latex of a fluorinated polymer f was prepared in the same manner as in Preparation Example 1, except that 18.0 g of sodium dialkyl sulfosuccinate ("PELEX CS" (tradename), manufactured by Kao Corporation) (A3) was used instead of sodium lauryl sulfate. The content of the fluorinated polymer f in the latex was 32 mass %. The copolymer composition of the fluorinated polymer f was TFE/P=56/44. The Mooney viscosity of the fluorinated polymer f was 140.

[Preparation Example 7] Preparation of Fluorinated Polymer g

Preparation Example 7 was carried out in the same manner as in Preparation Example 1, except that the monomer mixture gas and the polymerization temperature were changed. That is, a latex of a fluorinated polymer g was obtained in the same manner as in Preparation Example 1, except that as the monomer mixture gas to be injected into a reactor, at 25° C., a mixture gas of TFE/PNdF=25/6/69 (molar ratio) was injected under pressure so that the internal pressure of the reactor became 2.50 MPaG, and after the initiation of the polymerization reaction, while the polymerization temperature was maintained at 25° C., a monomer mixture gas of TFE/PNdF=39/26/35 (molar ratio) was optionally injected by the self pressure to continue the polymerization reaction. The content of the fluorinated polymer g in the latex was 30 mass %. The copolymer composition of the fluorinated polymer g was TFE/PNdF=39/26/35. The Mooney viscosity of the fluorinated polymer g was 90.

Example 1

As an anionic emulsifying agent (B), 2.7 g of an aqueous solution (diluent of "PELEX SS-L" (tradename) manufactured by Kao Corporation, aqueous solution (B1)) containing 20 mass % concentration of sodium alkyl diphenyl ether disulfonate was added to 50 g of the latex of the fluorinated polymer a obtained in Preparation Example 1 to obtain a binder composition 1 for a storage battery device.

The mass ratio (calculated value) of a content of each emulsifying agent per 100 parts by mass of the fluorinated polymer in the binder composition 1 is shown in Table 1 (the same applies hereinafter).

By using the obtained binder composition 1, an electrode mixture was prepared.

That is, 100 parts by mass of $LiNi_{0.5}Co_{0.2}Mn_{0.3}O_2$ (trade name "Selion L" manufactured by AGC Seimi Chemical Co., Ltd, tap density: 2.4 g/cm$^3$, average particle size: 12 µm) as a positive electrode active material and 2.5 parts by mass of acetylene black as an electrically conductive material, were mixed, and as a viscosity-adjusting agent, 20 parts by mass of a carboxymethyl cellulose aqueous solution having a concentration of 2 mass % was added, followed by kneading by using a planetary centrifugal mixer (THINKNY MIXER ARE-310 (trade name), manufactured by THINKY CORPORATION) for 10 minutes at 2000 rpm. Then, 10 parts by mass of a carboxymethyl cellulose aqueous solution having a concentration of 2 mass % was added, followed by further kneading for 10 minutes, and 8 parts by mass of the binder composition was added thereto, followed by kneading for 10 minutes, to obtain an electrode mixture 1.

The obtained electrode mixture 1 was applied to an aluminum foil (current collector) having a thickness of 20

μm by means of a doctor blade, then dried in a vacuum drier at 120° C. and then pressed by a roll press to a thickness of 80 μm to obtain a positive electrode 1.

By the above-mentioned methods, the adhesion, flexibility and charge and discharge characteristics were evaluated. The evaluation results are shown in Table 1 (the same applies hereinafter).

Example 2

A binder composition 2 for a storage battery device was obtained in the same manner as in Example 1, except that instead of the latex of the fluorinated polymer a, the latex of the fluorinated polymer b obtained in Preparation Example 2 was used.

In the same manner as in Example 1, an electrode mixture 2 and an electrode 2 were prepared, and they were evaluated in the same manner.

Example 3

A binder composition 3 for a storage battery device was obtained in the same manner as in Example 1, except that instead of the latex of the fluorinated polymer a, the latex of the fluorinated polymer c obtained in Preparation Example 3 was used.

In the same manner as in Example 1, an electrode mixture 3 and an electrode 3 were prepared, and they were evaluated in the same manner.

Example 4

A binder composition 4 for a storage battery device was obtained in the same manner as in Example 1, except that instead of the latex of the fluorinated polymer a, the latex of the fluorinated polymer d obtained in Preparation Example 4 was used.

In the same manner as in Example 1, an electrode mixture 4 and an electrode 4 were prepared, and they were evaluated in the same manner.

Example 5

A binder composition 5 for a storage battery device was obtained in the same manner as in Example 1, except that instead of the latex of the fluorinated polymer a, the latex of the fluorinated polymer f obtained in Preparation Example 6 was used.

In the same manner as in Example 1, an electrode mixture 5 and an electrode 5 were prepared, and they were evaluated in the same manner.

Example 6

A binder composition 6 for a storage battery device was obtained in the same manner as in Example 1, except that the added amount of an aqueous solution containing 20 mass % concentration of sodium alkyl diphenyl ether disulfonate as an anionic emulsifying agent (B) was changed to 8.5 g.

In the same manner as in Example 1, an electrode mixture 6 and an electrode 6 were prepared, and they were evaluated in the same manner.

Example 7

A binder composition 7 for a storage battery device was obtained in the same manner as in Example 1, except that the added amount of an aqueous solution containing 20 mass % concentration of sodium alkyl diphenyl ether disulfonate as an anionic emulsifying agent (B) was changed to 1.3 g.

In the same manner as in Example 1, an electrode mixture 7 and an electrode 7 were prepared, and they were evaluated in the same manner.

Example 8

A binder composition 8 for a storage battery device was obtained by adding 2.7 g of an aqueous solution containing 20 mass % concentration of sodium dodecylbenzene sulfonate ("NEOPELEX G" (tradename), manufactured by Kao Corporation) (diluent of (B2) as an anionic emulsifying agent (B) to 50 g of the latex of the fluorinated polymer a obtained in Preparation Example 1.

In the same manner as in Example 1, an electrode mixture 8 and an electrode 8 were prepared, and they were evaluated in the same manner.

Comparative Example 1

A binder composition 9 for a storage battery device was obtained in the same manner as in Example 1, except that instead of the latex of the fluorinated polymer a, the latex of the fluorinated polymer e obtained in Preparation Example 5 was used.

In the same manner as in Example 1, an electrode mixture 9 and an electrode 9 were prepared, and they were evaluated in the same manner.

Comparative Example 2

An electrode mixture 10 and an electrode 10 were prepared in the same manner as in Example 1, except that without adding an emulsifying agent to the latex of the fluorinated polymer a obtained in Preparation Example 1, the latex was used as it was as a binder composition 10 for a storage battery device, and they were evaluated in the same manner.

Comparative Example 3

A binder composition 11 for a storage battery device was obtained in the same manner as in Example 1, except that 2.7 g of an aquesous solution containing 20 mass % of sodium lauryl sulfate was added to 50 g of the latex of the fluorinated polymer a obtained in Preparation Example.

In the same manner as in Example 1, an electrode mixture 11 and an electrode 11 were prepared, and they were evaluated in the same manner.

Example 9

A binder composition 12 for a storage battery device was obtained in the same manner as in Example 1, except that instead of the latex of the fluorinated polymer a, the latex of the fluorinated polymer g obtained in Preparation Example 7 was used.

In the same manner as in Example 1, an electrode mixture 12 and an electrode 12 were prepared, and they were evaluated in the same manner.

Comparative Example 4

An electrode mixture 13 and an electrode 13 were prepared in the same manner as in Example 1, except that without adding an emulsifying agent to the latex of the fluorinated polymer g obtained in Preparation Example 7, the latex was used as it was as a binder composition 13 for a storage battery device, and they were evaluated in the same manner.

ecule, and as a result, the dispersion stability was improved, however, the charge and discharge rate characteristics of a second battery were poor, as compared with Comparative Example 2 in which an emulsifying agent was not added after polymerization.

TABLE 1

|  |  | Examples |  |  |  |  |  |  |  |  | Comparative Examples |  |  |  |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| Fluorinated polymer |  | a | b | c | d | f | a | a | a | g | e | a | a | g |
| Emulsifying agent added at the time of emulsion polymerization | Anionic emulsifying agent (A) | A1 | A1 | A1 | A2 | A3 | A1 | A1 | A1 | A1 |  | A1 | A1 | A1 |
|  | Anionic emulsifying agent (B) |  |  |  |  |  |  |  |  |  | B1 |  |  |  |
|  | Mass ratio of emulsifying agent per 100 parts by mass of fluorinated polymer | 2.0 | 0.8 | 4.0 | 2.0 | 2.0 | 2.0 | 2.0 | 2.0 | 2.0 | 2.0 | 2.0 | 2.0 | 2.0 |
| Emulsifying agent added after emulsion polymerization | Anionic emulsifying agent (A) |  |  |  |  |  |  |  |  |  |  | Not added | A1 | Not added |
|  | Anionic emulsifying agent (B) | B1 | B1 | B1 | B1 | B1 | B1 | B1 | B2 | B1 | B1 |  |  |  |
|  | Mass ratio of emulsifying agent per 100 parts by mass of fluorinated polymer | 3.5 | 3.4 | 3.6 | 3.5 | 3.4 | 11.0 | 1.7 | 3.5 | 3.5 | 3.5 | — | 3.5 | — |
| Mooney viscosity of fluorinated polymer |  | 110 | 130 | 70 | 130 | 140 | 110 | 110 | 110 | 90 | 60 | 110 | 110 | 90 |
| Dispersion stability | Flocculation rate [%] | 0.7 | 3.5 | 0.5 | 0.6 | 1.0 | 0.5 | 2.5 | 1.0 | 0.8 | 8.8 | 35.0 | 1.0 | 40.0 |
| Adhesion | Peel strength [N] | 3.0 | 2.5 | 2.5 | 3.1 | 2.9 | 2.8 | 1.8 | 2.9 | 3.2 | 1.1 | 1.2 | 2.6 | 1.3 |
| Charge and discharge cycle characteristics | Capacity retention rate [%] | 98 | 98 | 94 | 98 | 97 | 96 | 97 | 96 | 97 | 90 | 85 | 87 | 97 |
| Charge and discharge rate characteristics (initial) | Discharge capacity ratio [%] | 90 | 88 | 85 | 91 | 88 | 87 | 90 | 90 | 91 | 70 | 85 | 86 | 84 |
| Charge and discharge rate characteristics (after 100 cycles) | Discharge capacity ratio [%] | 80 | 82 | 70 | 82 | 79 | 65 | 78 | 76 | 80 | 25 | 50 | 20 | 45 |

As shown in the results in Table 1, the fluorinated polymers of Examples 1 to 9 were binder compositions for a storage battery device prepared by adding an anionic emulsifying agent (B) having a phenyl group in its molecule to a latex containing a fluorinated polymer emulsion polymerized by using an anionic emulsifying agent (A) having no phenyl group in its molecule, whereby the dispersion stability as the binder composition was excellent, flocculation tends not to occur when external force is applied, the adhesion of an electrode to be obtained was excellent, and the volume retention rate of a secondary battery was excellent.

On the other hand, in Comparative Example 1 wherein a latex prepared by emulsion polymerization using an anionic emulsifying agent (B) having a phenyl group in its molecule was used, since the viscosity of a fluorinated polymer latex was remarkably low, the molecular weight of the fluorinated polymer was considered to be low. Further, the adhesion of an electrode to be obtained was insufficient, and the charge and discharge rate characteristics of a secondary battery were poor.

In Comparative Example 2, an anionic emulsifying agent (B) having a phenyl group in its molecule was not added to a latex prepared by emulsion polymerization using an anionic emulsifying agent (A) having no phenyl group in its molecule, and as a result, the dispersion stability as the binder composition was poor.

In Comparative Example 3, an anionic emulsifying agent (A) having no phenyl group in its molecule was added to a latex prepared by emulsion polymerization using an anionic emulsifying agent (A) having no phenyl group in its mol-

INDUSTRIAL APPLICABILITY

An electrode using an electrode mixture for a storage battery cell, which contains a binder composition for a storage battery device obtained by the production method of the present invention is widely useful for a storage battery device such as a primary lithium battery, a lithium-ion secondary battery, a lithium polymer battery, an electric double layer capacitor or a lithium-ion capacitor, particularly as an electrode for a lithium-ion secondary battery.

This application is a continuation of PCT Application No. PCT/JP2013/078370, filed on Oct. 18, 2013, which is based upon and claims the benefit of priority from Japanese Patent Application No. 2012-232196 filed on Oct. 19, 2012. The contents of those applications are incorporated herein by reference in their entireties.

What is claimed is:

1. A method for producing a binder composition for a storage battery device, which comprises:
    emulsion polymerizing a monomer mixture containing a fluorinated vinyl monomer in the presence of an anionic emulsifying agent (A), an aqueous medium and a radical polymerization initiator to form a latex containing a fluorinated polymer, then
    mixing, after emulsion polymerizing, an anionic emulsifying agent (B) with the latex to form the binder composition;
    wherein the anionic emulsifying agent (A) is an anionic emulsifying agent having no phenyl group in its molecule, and the emulsion polymerizing is carried out in the absence of an anionic emulsifying agent having a phenyl group, wherein the content of the anionic emulsifying agent (A) in the monomer mixture during the emulsion polymerizing is from 0.8 to 4.0 parts by mass per 100 parts by mass of the fluorinated polymer produced by the emulsion polymerizing, the anionic emulsifying agent (B) is an anionic emulsifying agent having a phenyl group in its molecule, and wherein, after the mixing, the anionic emulsifying agent (B) is present in an amount of 1.7 to 11 parts by mass per 100 parts by mass of the fluorinated polymer in the latex.

2. The method for producing a binder composition for a storage battery device according to claim 1, wherein during the emulsion polymerizing the content of the anionic emulsifying agent (A) is from 0.1 to 5 parts by mass, per 100 parts by mass of the fluorinated polymer produced by the emulsion polymerizing.

3. The method for producing a binder composition for a storage battery device according to claim 1, wherein the content of the anionic emulsifying agent (B) in the binder composition after the mixing is from 0.1 to 15 parts by mass, per 100 parts by mass of the fluorinated polymer in the latex.

4. The method for producing a binder composition for a storage battery device according to claim 1, wherein at least one of the anionic emulsifying agent (A) and the anionic emulsifying agent (B) is an emulsifying agent having a sulfonyl group.

5. The method for producing a binder composition for a storage battery device according to claim 1, wherein the anionic emulsifying agent (A) is at least one type selected from the group consisting of an alkylsulfate, a sulfosuccinate, a polyoxyalkylene alkyl ether sulfate and a polyoxyalkylene alkenyl ether sulfate.

6. The method for producing a binder composition for a storage battery device according to claim 1, wherein the anionic emulsifying agent (B) is at least one type selected from the group consisting of an alkylbenzene sulfonate and an alkyl diphenylether disulfonate.

7. The method for producing a binder composition for a storage battery device according to claim 1, wherein the fluorinated vinyl monomer is at least one type selected from the group consisting of tetrafluoroethylene, vinylidene fluoride and hexafluoropropylene.

8. The method for producing a binder composition for a storage battery device according to claim 1, wherein the monomer mixture further contains a non-fluorinated vinyl monomer.

9. The method for producing a binder composition for a storage battery device according to claim 1, wherein the fluorinated vinyl monomer is tetrafluoroethylene, and the monomer mixture further contains propylene.

10. A method for producing an electrode mixture for a storage battery device, which comprises:
producing the binder composition for a storage battery device by the production method as defined in claim 1 and
mixing the binder composition for a storage battery device and an electrode active material to form the electrode mixture.

11. A method for producing an electrode for a storage battery device, which comprises:
producing the electrode mixture for a storage battery device by the production method as defined in claim 10, and
forming an electrode active material layer on a current collector with the electrode mixture for a storage battery device to form the electrode.

12. The method for producing a binder composition for a storage battery device according to claim 1, wherein the anionic emulsifying agent (A) is at least one selected from the group consisting of sodium lauryl sulfate, ammonium lauryl sulfate and sodium dialkyl sulfosuccinate.

13. The method for producing a binder composition for a storage battery device according to claim 1, wherein the anionic emulsifying agent (B) is at least one selected from the group consisting of sodium alkyl diphenyl ether disulfonate and sodium dodecyl benzene sulfonate.

14. The method for producing an electrode mixture for a storage battery device according to claim 10, further comprising:
mixing the binder composition for a storage battery device with an electrically conductive material.

* * * * *